April 12, 1932. L. A. PARADISE 1,853,177
HARVESTER
Filed Dec. 30, 1929 3 Sheets-Sheet 2
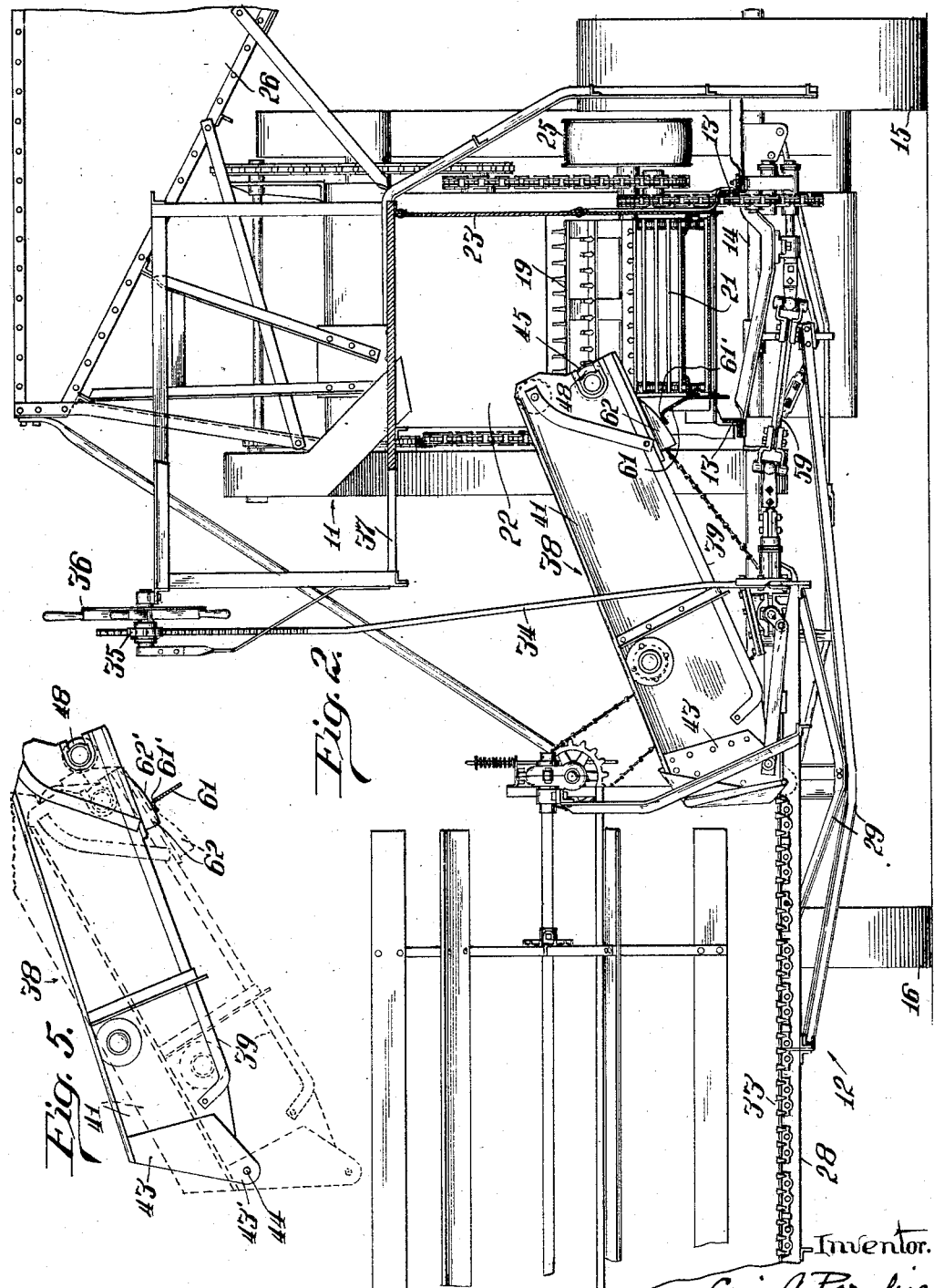

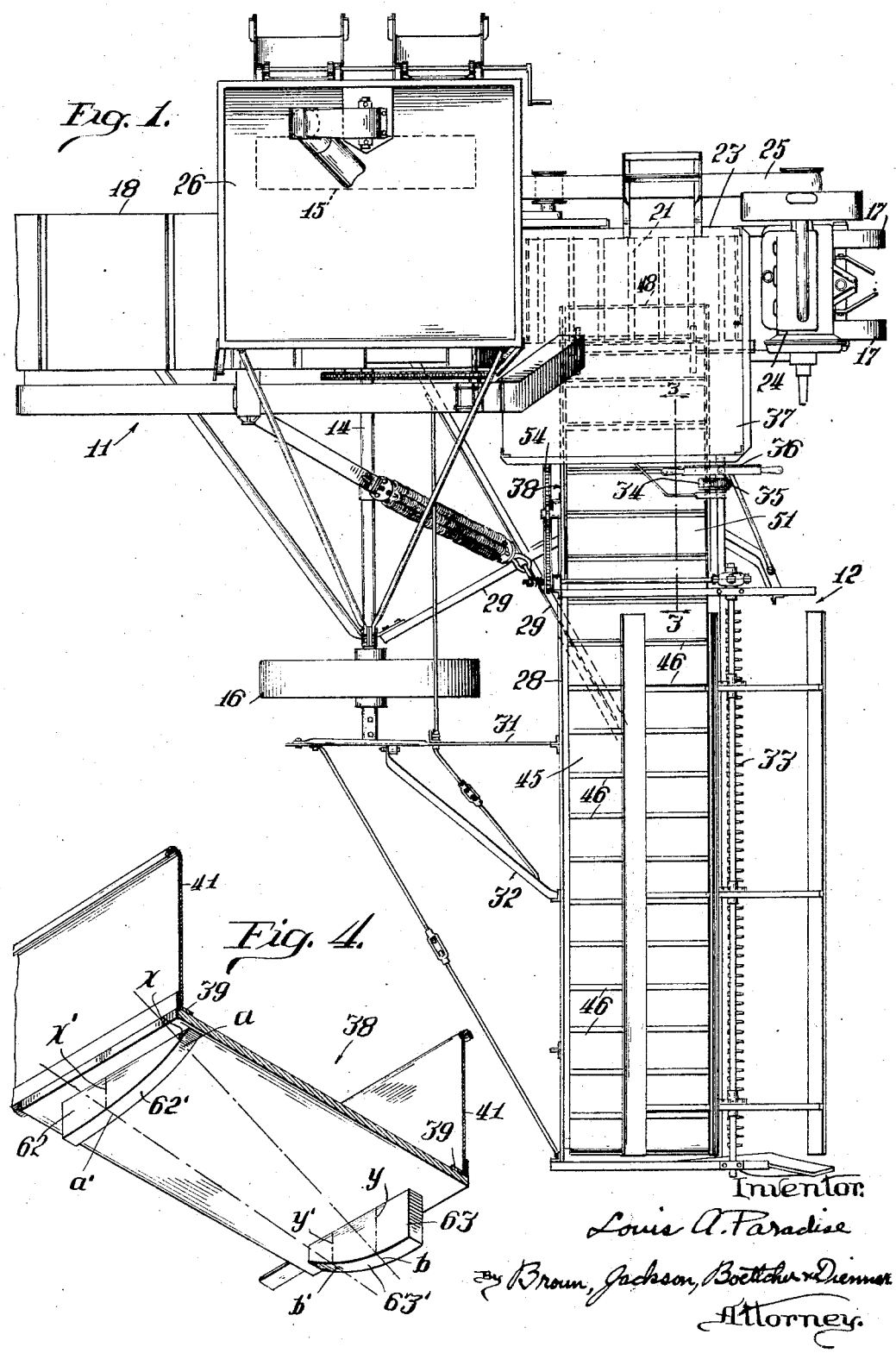

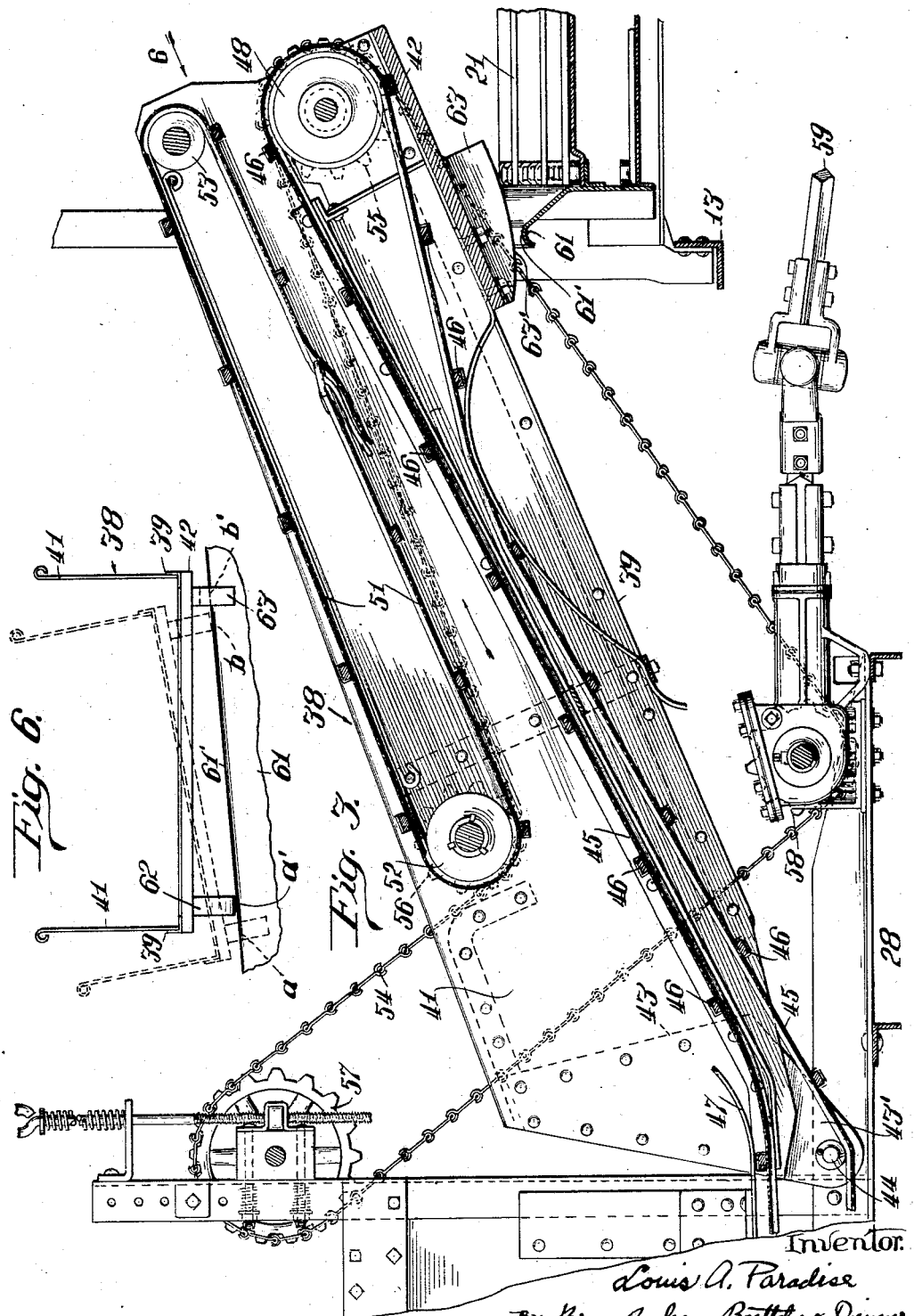

Patented Apr. 12, 1932

1,853,177

UNITED STATES PATENT OFFICE

LOUIS A. PARADISE, OF MOLINE, ILLINOIS, ASSIGNOR TO DEERE & COMPANY, OF MOLINE, ILLINOIS, A CORPORATION OF ILLINOIS

HARVESTER

Application filed December 30, 1929. Serial No. 417,427.

The present invention relates to combined harvesters and threshers which cut, thresh and clean the grain as a continuous operation while the implement is in motion in the field. The invention is primarily concerned with the manner of supporting the conveyor which transfers the cut grain from the harvester to the thresher.

In the conventional combine the cutter bar edge of the harvester is usually raised and lowered for adjusting the height of cutting by swinging the entire harvester frame about a pivot axis extending transversely of the machine and substantially parallel with the cutter bar edge. In such adjustments it is preferable that the conveyor pivot with the harvester frame about this same transverse axis and consequently the conveyor must be capable of being inclined sidewise at different angles in accommodating the different height adjustments of the cutter bar edge of the harvester.

Heretofore, considerable difficulty has been encountered in supporting the conveyor and still affording the necessary flexibility of mounting to accommodate such sidewise inclination. If the conveyor is constructed as a rigid extension of the inner end of the harvester platform, it is necessary to provide a very large opening in the side of the thresher housing to accommodate the considerable angle through which the discharge end of the conveyor then swings with the different vertical adjustments of the harvester. This transversely extending conveyor generally discharges the grain upon a longitudinally extending conveyor disposed within the thresher housing, and such longitudinally extending conveyor conveys the grain to the threshing cylinder. If these two conveyors are connected together so that the longitudinally extending conveyor swings about a rearwardly disposed axis with the vertical movement of the transversely disposed conveyor, the angle of feed of the longitudinally extending conveyor relative to the thresher cylinder is changed with each vertical adjustment of the harvester and an expensive and complicated construction is required. If the transversely extending conveyor is hinged to the inner end of the harvester platform with the discharge end thereof suspended from the thresher frame on chains or the like, it is necessary to adjust these chains with each vertical adjustment of the harvester, and there is always the likelihood of subjecting such conveyor to twisting or warping strains.

The present invention avoids all of these objections by providing improved supporting means for the conveyor which permits the conveyor to be hinged to the harvester platform and which supports the discharge end of the conveyor on the thresher so that the frame of said conveyor is not subjected to any twisting or warping stresses in any of its sidewise inclinations. Thus, there is no necessity for a large opening in the side of the thresher housing, the longitudinally extending conveyor in said housing can be maintained in a permanent position relative to the threshing cylinder, and there is no necessity for making separate adjustments of the supporting means for the transverse conveyor with each different vertical adjustment of the harvester. Other objects and advantages of the invention will appear from the following detailed description of a preferred embodiment thereof. In the accompanying drawings illustrating such embodiment:

Figure 1 is a plan view of the major portion of a combine in which the invention is disclosed.

Figure 2 is a fragmentary front view with part of the thresher shown in section.

Figure 3 is a sectional view on a larger scale taken along the plane of the line 3—3 of Figure 1.

Figure 4 is a perspective view in section of the upper discharge portion of the conveyor, illustrating the two beveled supporting blocks.

Figure 5 is a fragmentary view of the conveyor, showing in full lines the position it assumes when the harvester platform is raised to its highest position, and showing in dotted lines the position the conveyor assumes when the harvester platform is in its lowest position, and Figure 6 is a fragmentary view of the discharge end of the conveyor, looking in the direction of the arrow 6 in Figure 3, and showing in full lines the position the conveyor assumes when the harvester platform is in its highest position, and in dotted lines the position it assumes when the harvester platform is in its lowest position.

In Figures 1 and 2 the thresher portion of the implement is designated 11 in its entirety and the harvester portion is designated 12. The specific constructions of the threshing and harvesting mechanisms are not of the essence of the present invention and hence such mechanisms need not be described in detail. As illustrative of one manner of supporting the implement, the main frame of the thresher, comprising the frame bars 13, 13 (Figure 2), is supported on an axle 14 on which the wheels 15 and 16 are journaled. The axle 14 is illustrated as being extended considerably from the grain side of the thresher for disposing the wheel 16 in rear of the harvester 12.

The front end of the thresher frame is supported on two front steering wheels 17. The threshing mechanism is enclosed within a casing 18 mounted on the rear portions of the frame members 13, a part of this threshing mechanism being represented by the threshing cylinder 19 illustrated in Figure 2. Extending forwardly from this threshing cylinder is a longitudinal conveyor 21 traveling in a grain receiving compartment which is substantially closed on three sides by the casing walls indicated at 23. Said compartment, designated 22, is open on the grain side of the thresher for permitting the transverse conveyor to extend into a discharging position over the longitudinal conveyor 21, as I shall presently describe.

Power for driving the several operating parts of the implement is illustrated as being derived from an internal combustion engine 24 which is mounted on the front portion of the thresher frame and which transmits its drive through a belt 25. The grain storage tank 26 is mounted on a frame super-structure above the threshing mechanism.

The frame of the harvester 12 is generally indicated at 28 and such frame is mounted on the axle 14 by supporting bars 29, 31 and 32. Said bars have pivotal support on the axle whereby the harvester platform may be swung upwardly and downwardly about the axle as a pivot axis.

The purpose of this swinging movement is to raise and lower the cutter bar mechanism 33 for different heights of cutting, as previously described.

Such adjustments are effected through an adjusting rod 34 (Figure 2) connected at its lower end to the frame of the harvester platform and having rack and pinion connection 35 with an adjusting wheel 36 mounted on the operator's platform 37.

The transverse conveyor 38, with which the present invention is primarily concerned, conveys the cut grain from the platform of the harvester 12 to the longitudinally extending feeding conveyor 21 in the thresher unit. The frame of such transverse conveyor 38 comprises two side angle bars 39 from which rise the sheet metal side walls 41. At the discharge end of said conveyor a bottom plate 42 extends transversely between the frame bars 39, and at the receiving end of said conveyor, mounting plates 43 are secured to the outer sides of the side walls 41. Such mounting plates have downwardly extending ears 43′ which are mounted on pivot pins 44 carried by the frame bars 28 of the harvester. The conveyor belt 45, having the usual cross slats 46, has its upper flight passing out from under the curved guide shoes 47 on the harvester and extending up and over the drive wheel 48 rotatably supported in the discharge end of the conveyor. The return flight passes down under a suitable roller at the pivot axis 44 for traveling out to the outer end of the harvester platform, and any suitable spring means may be arranged to cooperate with this lower flight for maintaining the belt taut. Another belt 51 is preferably disposed above the main conveying belt 45, and travels over wheels 52 and 53 journaled between the side walls of the conveyor trough.

Both belts are driven through a chain 54 which is trained around sprocket wheels 55 and 56 secured respectively to the driving wheels 48 and 52, such chains also passing over a sprocket wheel 57 which has spring mounting on the harvester frame. Said chain is driven from a sprocket wheel 58 which in turn is driven through a universally jointed shaft 59 deriving power from the power plant 24 on the thresher.

The discharge end of the transverse conveyor 38 extends into the open side of the grain feeding compartment 22 for delivering the grain upon the feeding conveyor 21, and this delivery end of the conveyor structure 38 rests upon a stationary supporting ledge 61 in the form of a plate extending upwardly along the lower side of the feeding compartment and having a curved upper edge, as illustrated in Figures 2 and 3. It will be noted that in each height adjustment of the harvester platform the free end of the transverse conveyor 38 has two movements relative to the supporting ledge 61: (1), a sidewise inclination through an arcuate path around the wheel axle 14, such following because of the hinged connection 44 between the harvester and conveyor; and (2), an endwise sliding motion inwardly and outwardly with respect to the grain feeding compartment 22 as this hinge axis swings upwardly and downwardly in its arcuate path around the axis of the wheel axle 14.

In providing supporting means which will support this end of the conveyor against twisting and warping stresses notwithstanding the different sidewise inclinations of the conveyor, I employ a unique arrangement of beveled supports which utilize the endwise sliding motion of the conveyor for maintaining the proper support of the conveyor in its different sidewise inclinations. Such beveled supports consist of two blocks 62 and 63 which are secured to the bottom of the crossplate 42 at laterally spaced points and have reversely beveled bottom surfaces 62' and 63'. As shown in Figure 4, the block 62 adjacent the forward wall of the conveyor has its bevel or slope tapering down toward the discharge end of the conveyor, and the other block 63 adjacent to the rear side wall of the conveyor has its bevel or slope tapering down toward the receiving end of the conveyor. Both of these blocks rest upon the curved upper surface 61' of the stationary support 61 on the thresher. It will be evident that when the conveyor slides endwise in an outward direction relatively to the stationary support 61, a low point of the front block 62 rides on to such stationary support and at the same time, a high point of the other or rear block 63 rides up on to such stationary support, and, conversely, when the conveyor is slid endwise in an inward direction the reverse of this action takes place. Such affords an automatically changing angle of support for the upper end of the conveyor, as I shall now describe in detail. In its lowermost position of adjustment, the harvester platform, and therefore also the lower end of the conveyor, is inclined forwardly considerably.

Such adjustment, having also lowered the hinge axis 44, has slid the conveyor outwardly with respect to the feeding compartment of the thresher. The dotted line position in Figure 6 typically represents the sidewise angle of inclination at which the upper and lower ends of the conveyor should be supported for this lowermost adjustment of the harvester platform. Through the aforesaid outward sliding movement of the conveyor, a low point on the front beveled support 62 has been brought into engagement with the fixed support 61, such low point on the beveled support being typically indicated at $a$, and at the same time a high point on the rear beveled support 63 has been brought into engagement with the stationary support, such high point on the rear beveled support being typically represented at $b$. Hence the front side of the conveyor is positioned above the stationary support at a distance $x$, and the rear side of the conveyor is positioned above said stationary support a distance $y$. The stationary and moving supporting surfaces 61', 62' and 63' are so proportioned that the differential between the distances $x$ and $y$ properly supports both sides of the upper end of the conveyor parallel to its lower end i. e., parallel to the harvester platform and pivot axis 44.

When the harvester platform is raised to its uppermost position, it assumes an angle more nearly horizontal and therefore places the lower end of the conveyor more nearly parallel to the horizontal line of advance.

At the same time the upward movement of the pivot axis 44 causes the discharge end of the elevator to be slid inwardly with respect to the grain feeding compartment of the thresher, substantially as illustrated by the full line position in Figure 5. Through such inward sliding motion a high point on the front supporting block 62 now rides upon the stationary support, such high point being represented at $a'$, and at the same time a relatively low point on the rear supporting block 63 rides onto the stationary support, such relatively low point being typically represented at $b'$. The distances $x'$ and $y'$ of the two points are so proportioned that the upper end of the conveyor is supported parallel to its lower pivoted end. The full line position of the conveyor in Figure 6 is representative of the different fore and aft angle of the conveyor when the harvester platform is adjusted to or into proximity to its uppermost position. Likewise, in all intermediate vertical adjustments of the harvester platform the inward or outward sliding motion of the free end of the conveyor will bring into contact with the stationary support different points of the two beveled blocks, having such differential heights as will support the upper end of the conveyor parallel with the lower end. Thus the conveyor structure is not subject to any twisting or warping stresses. The upper end of the conveyor has very little vertical movement and hence does not require a large opening in the side of the grain receiving compartment 22, and the action is entirely automatic so that there is no necessity for adjusting any supporting means for the upper end of the conveyor with each vertical adjustment of the harvester platform.

While the construction which I have shown and described constitutes what I consider to be the preferred embodiment of my invention, nevertheless it will be understood that numerous modifications and rearrangements may be made without departing from the essence of the invention. For example, the relation of the supports might be reversed by having the two parallel sloping supports mounted stationary and by having the other transverse support 61 arranged for movement with the conveyor. As will be seen from Figure 6, the stationary transverse support 61 is shown as being sloped forwardly and downwardly at a slight angle approximately intermediate the two extreme angles of the conveyor, such being desirable to avoid making either block exceptionally high, but it will be evident that by the proper proportioning of the slopes and heights of the blocks this stationary supporting surface may be arranged at any angle desired.

I claim:

1. In a combine, the combination of a harvester, a thresher, a conveyor pivotally connected to the harvester at its lower end and with its upper end resting on the thresher, and supporting means between the upper end of said conveyor and the thresher for maintaining the upper end of the conveyor substantially parallel to the lower end of the conveyor in all positions of the harvester.

2. In a combine, the combination of a harvester, a thresher, a conveyor pivotally connected to the harvester at its lower end and with its upper end resting on the thresher, and supporting means for maintaining the sidewise inclination of the upper end of the conveyor substantially equal to the forward inclination of the harvester.

3. In a combine, the combination of a harvester, a thresher, a conveyor extending between said harvester and thresher, and oppositely beveled members supporting said conveyor on said thresher.

4. In a combine, the combination of a harvester, a thresher, means for raising and lowering said harvester, a conveyor extending between said harvester and thresher, and suppporting means between the discharge end of the conveyor and the thresher for maintaining the latter end of said conveyor substantially parallel to the receiving end of said conveyor in different adjusted positions of the harvester.

5. In a combine, the combination of a harvester, a thresher, means for adjusting said harvester vertically about a transversely extending axis, a conveyor extending between said harvester and thresher, and supporting means for maintaining the sidewise inclination of the discharge end of the conveyor substantially equal to the forward inclination of the harvester.

6. In a combine, the combination of a harvester, a thresher, means for adjusting the cutting height of said harvester, a conveyor extending between said harvester and thresher with its discharge end adapted to slide endwise in the aforesaid adjustments of said harvester, and means utilizing such endwise sliding movement for maintaining the discharge end of the conveyor substantially parallel to the receiving end thereof in the different adjustments of said harvester.

7. In a combine, the combination of a harvester, a thresher, means for inclining said harvester about a transversely extending axis for adjusting the cutting height thereof, a conveyor extending between said harvester and thresher with its discharge end adapted to slide endwise in the aforesaid adjustments of said harvester, and coacting supporting members on the thrasher and on the discharge end of said conveyor utilizing such endwise sliding movement of the conveyor to maintain the sidewise inclination of the discharge end of the conveyor substantially equal to the forward inclination of the harvester.

8. In a combine, the combination of a harvester, a thresher, a conveyor extending between said harvester and thresher and movably associated with both, and means for supporting the conveyor on the thresher comprising a pair of laterally spaced supporting members and a cooperating transverse supporting member, said laterally spaced supporting members having reversely sloped surfaces adapted to engage with said transverse supporting member.

9. In a combine, the combination of a harvester, a thresher, means for adjusting the cutting height of said harvester by inclining the same about a transversely extending axis, a conveyor pivotally connected to the harvester at one end, and means for supporting the other end on the thresher comprising a pair of laterally spaced supporting members and a cooperating transverse supporting member, said laterally spaced supporting members having reversely sloped surfaces engaging with said transverse supporting member and effective by relative movement between said latter supporting member and said spaced supporting members for maintaining the sidewise inclination of the latter end of the conveyor substantially equal to the forward inclination of the harvester.

10. In a combine, the combination of a harvester, a thresher, a conveyor extending between said harvester and thresher and movably associated with both, and means for supporting the conveyor on the thresher comprising a pair of laterally spaced supporting members connected with the conveyor and a cooperating transverse supporting member mounted on the thresher, said laterally spaced supporting members having reversely sloped surfaces engaging with said transverse supporting member.

11. In a combine, the combination of a harvester, a thresher, transversely extending axle means, means pivotally supporting said harvester on said axle means, adjusting means for rocking said harvester about its pivotal mounting on said axle means to adjust the height of cutting, a conveyor pivotally connected at its lower end to the platform of said harvester, a pair of laterally spaced supporting blocks secured to the underside of the upper end of said conveyor, and a supporting member mounted on the thresher and extending substantially transversely to said supporting blocks, said blocks having reversely sloping surfaces resting on said transverse supporting member and effective by endwise sliding movement of the upper end of the conveyor for maintaining the sidewise inclination of such upper end substantially equal to the forward inclination of the harvester.

12. In a combine, the combination of a harvester, a thresher, transversely extending axle means, means pivotally supporting said harvester on said axle means, adjusting means for rocking said harvester about its pivotal mounting on said axle means to adjust the height of cutting, a conveyor pivotally connected at its lower end to the platform of said harvester, a pair of laterally spaced supporting blocks secured to the underside of the upper end of said conveyor, and a supporting member mounted on the thresher and extending substantially transversely to said supporting blocks, the supporting block adjacent to the forward side of the conveyor having a bottom supporting surface sloping upwardly toward the discharge end of the conveyor, and the block adjacent to the rear side of the conveyor having a bottom supporting surface sloping upwardly toward the opposite end of the conveyor, said reversely sloping surfaces being effective in endwise sliding movement across said transverse supporting member to maintain the sidewise inclination of the upper end of the conveyor substantially equal to the forward inclination of the harvester.

13. In a combine, the combination of a harvester, a thresher, a conveyor extending between said harvester and thresher and pivotally connected at one end with said harvester, and supporting means cooperating with the other end of said conveyor and operative automatically in the adjustment of the harvester for maintaining the latter end of the conveyor substantially parallel to the pivoted end of the conveyor in substantially all positions of the harvester.

14. In a combined harvester and thresher, the combination of a main frame for the thresher, a harvester frame pivotally supported to permit the front edge of the harvester to be raised and lowered by fore and aft pivotal movement about a transversely extending axis, a conveyor having its receiving end movably associated with said harvester frame, and supporting means cooperating with the other end of said conveyor and operative automatically in the adjustment of said harvester frame to support the latter end of said conveyor substantially parallel to the receiving end of the conveyor.

15. In a combine, the combination of a harvester, a thresher, transversely extending axle means, means pivotally supporting said harvester on said axle means, adjusting means for rocking said harvester about its pivotal mounting on said axle means to adjust the height of cutting, a conveyor pivotally connected at its lower end to the platform of said harvester extending upwardly to and supported on said thresher adjacent the upper end of the conveyor whereby when said harvester is rocked about its pivotal mounting endwise sliding movement of said conveyor is caused, a pair of laterally spaced supporting blocks secured to the under side of the upper end of said conveyor, and a supporting member mounted on the thresher and extending substantially transversely to and under said supporting blocks and on which said blocks support said conveyor, the supporting block adjacent to the forward side of the conveyor having a bottom supporting surface sloping upwardly toward the upper end of the conveyor, and the supporting block adjacent to the rear side of the conveyor having its entire bottom supporting surface sloping upwardly toward the lower end of the conveyor, said reversely sloping surfaces being effective in endwise sliding movement of the conveyor across said transverse supporting member to maintain the sidewise inclination of the upper end of the conveyor relative to the thresher substantially equal to the inclination of the harvester in its adjustments about its pivotal mounting.

16. In a combine, the combination of a harvester, a thresher, means for adjusting the cutting height of said harvester, said thresher having an opening in the side thereof adjacent to the harvester, a conveyor extending between said harvester and thresher and projecting through said opening and adapted to slide endwise in the aforesaid adjustment of said harvester, and means utilizing such endwise sliding movement for maintaining the discharge end of the conveyor substantially parallel to the receiving end thereof in the different adjustments of the harvester, said means cooperating with the lower edge of said opening.

In witness whereof, I hereunto subscribe my name this 23rd day of December, 1929.

LOUIS A. PARADISE.